(12) United States Patent
Harris

(10) Patent No.: US 10,977,364 B2
(45) Date of Patent: Apr. 13, 2021

(54) SYSTEM AND METHOD FOR MONITORING EFFECTIVE CONTROL OF A MACHINE

(71) Applicant: Microsoft Technology Licensing, LLC, Redmond, WA (US)

(72) Inventor: Andrew F. Harris, Stony Brook, NY (US)

(73) Assignee: Microsoft Technology Licensing, LLC, Redmond, WA (US)

(*) Notice: Subject to any disclaimer, the term of this patent is extended or adjusted under 35 U.S.C. 154(b) by 358 days.

(21) Appl. No.: 15/898,359

(22) Filed: Feb. 16, 2018

(65) Prior Publication Data

US 2019/0258799 A1 Aug. 22, 2019

(51) Int. Cl.
*H04L 9/00* (2006.01)
*G06F 21/55* (2013.01)
*G06F 21/60* (2013.01)
*H04L 29/06* (2006.01)

(52) U.S. Cl.
CPC .......... *G06F 21/554* (2013.01); *G06F 21/552* (2013.01); *G06F 21/604* (2013.01); *H04L 63/101* (2013.01); *H04L 63/102* (2013.01); *H04L 63/104* (2013.01); *H04L 63/1425* (2013.01); *H04L 63/1433* (2013.01); *H04L 63/10* (2013.01)

(58) Field of Classification Search
CPC .................................................. G06F 21/554
USPC ......................................................... 726/25
See application file for complete search history.

(56) References Cited

U.S. PATENT DOCUMENTS

| 9,407,655 | B2* | 8/2016 | Futty ................... H04L 63/10 |
| 2005/0268112 | A1 | 12/2005 | Wang et al. |
| 2009/0271863 | A1* | 10/2009 | Govindavajhala ......................... H04L 63/1433 726/23 |
| 2016/0092802 | A1* | 3/2016 | Theebaprakasam ........................ G06Q 10/0631 705/7.12 |
| 2017/0012990 | A1* | 1/2017 | Himberger ............ H04L 63/104 |
| 2017/0171208 | A1* | 6/2017 | Purushothaman .... H04L 63/104 |

OTHER PUBLICATIONS

"International Search Report and Written Opinion Issued in PCT Application No. PCT/US2019/017144", dated May 16, 2019, 12 Pages.

* cited by examiner

*Primary Examiner* — Christopher J Brown
(74) *Attorney, Agent, or Firm* — Fiala & Weaver P.L.L.C.

(57) ABSTRACT

Systems and methods for identifying a security risk include a security group analyzer that identifies a first set of users belonging to a security group such as a local administrators' group. A privileges analyzer identifies a second set of users having one or more privileges gained from user rights assignments that may pose a security risk. An autostart extensibility point (ASEP) access analyzer identifies a third set of users by identifying users having access to an ASEP entry or an image path identified by an ASEP entry. A security risk identifier identifies security risks by identifying users that are in the second or third set of users but are not in the first set of users. A security handler performs a responsive action in response to the identification of the security risk. A security graph builder uses the identified interrelationships to build a security graph that illustrates the security risks.

20 Claims, 8 Drawing Sheets

SYSTEM AND METHOD FOR MONITORING EFFECTIVE CONTROL OF A MACHINE

BACKGROUND

Providing security for computer resources is increasingly important and difficult to do. To secure a computer system or network, access to the system and the ability to control certain functions of the system must be monitored and limited to defined groups of users possessing the appropriate credentials. As a result, users of a secure computer system or network are typically required to enter user identifying information such as passwords and usernames so that the activity of the users on the system can be monitored and controlled. Unfortunately, passwords, usernames and other forms of identification are often stolen or otherwise compromised by actors with malicious intent. In addition, an increasing number of novel methods of subverting or overcoming existing security measures are regularly being developed and deployed. Therefore, it is crucial to secure and monitor access to computing systems and networks and identify any users that can exert control over any of the critical functions of the systems and networks.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses for identifying a security risk include a security group analyzer that identifies a first set of users and/or their user identifiers belonging to a security group such as a local administrators' group. A privileges analyzer identifies a second set of users having one or more privileges gained from user rights assignments that may pose a security risk. An auto-start extensibility point (ASEP) access analyzer identifies a third set of users by discovering users having access to an ASEP entry or an image path identified by an ASEP entry. A security risk identifier identifies security risks by identifying users that are in the second or third set of users but are not in the first set of users. A security handler performs a responsive action in response to the identification of the security risk. A security graph builder uses the identified interrelationships to build a security graph that illustrates the security risks.

Further features and advantages of the systems and methods, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present methods and systems and, together with the description, further serve to explain the principles of the methods and systems and to enable a person skilled in the pertinent art to make and use the methods and systems.

Figure 1:
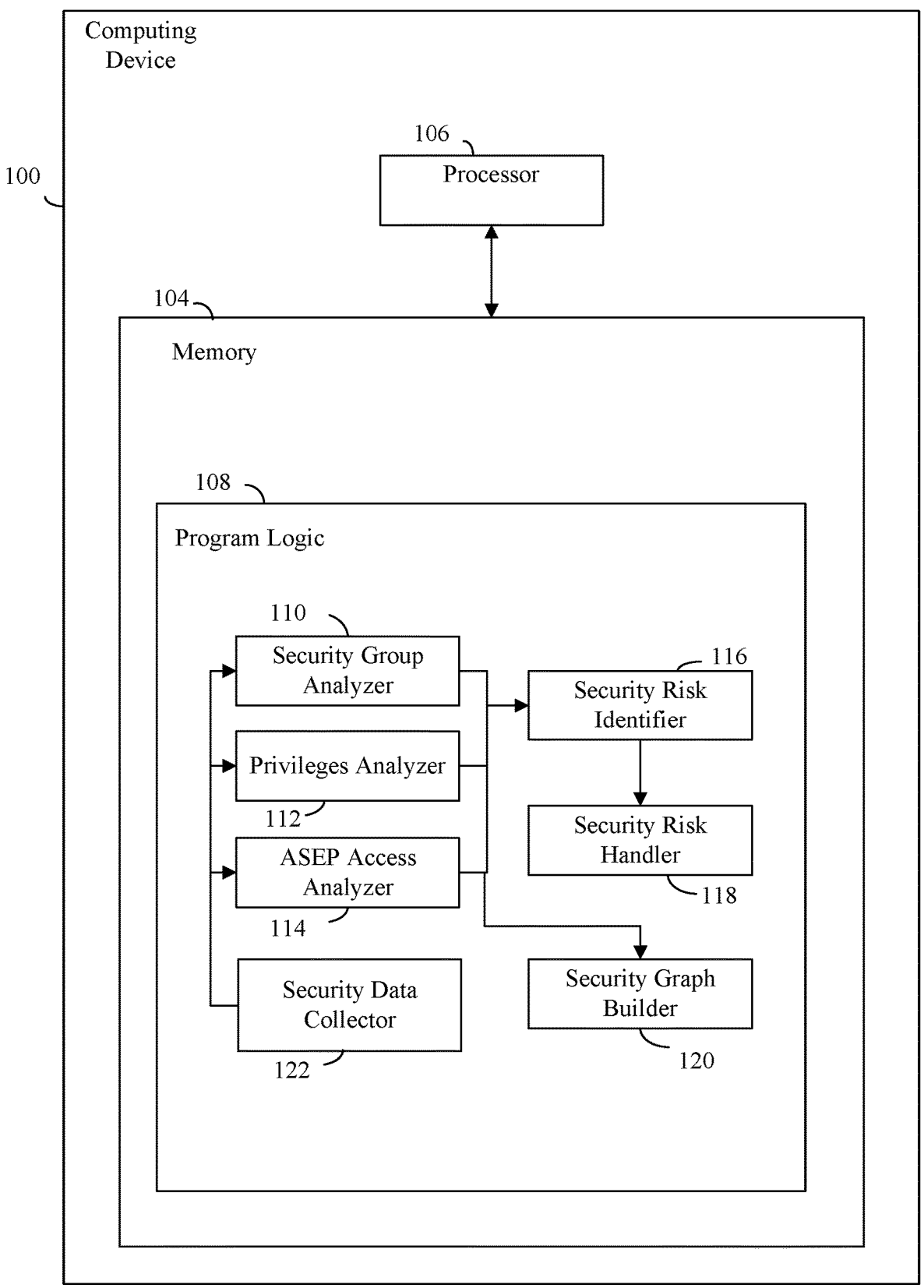
FIG. 1 is a block diagram of a computing-device-based system for identifying a security risk to one or more computing devices in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Introduction

The present specification and accompanying drawings disclose one or more embodiments that incorporate the features of the present methods and systems. The scope of the present methods and systems is not limited to the disclosed embodiments. The disclosed embodiments merely exemplify the present methods and systems, and modified versions of the disclosed embodiments are also encompassed by the present methods and systems. Embodiments of the present methods and systems are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

The example embodiments described herein are provided for illustrative purposes, and are not limiting. The examples described herein may be adapted to any type of method or system for monitoring effective control of a machine. Further structural and operational embodiments, including modifications/alterations, will become apparent to persons skilled in the relevant art(s) from the teachings herein.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Example Embodiments

Methods and systems described herein relate to identifying a security risk to one or more computing devices or networks. Users and administrators of computing resources have a securable identification that includes user identifiers such as usernames, passwords and credentials that give them the ability or privilege to perform certain tasks or access certain functions of the resource. To secure computer resources, it is important to know which users have certain user rights, credentials and/or privileges to control or modify the functioning of a securable object. User rights may include two general categories: logon rights and privileges. Logon rights control who is authorized to log on to a computer and how they can log on. Privileges control access to system-wide resources on a computer and can override the permissions that are set on particular securable objects.

Perhaps surprisingly, local administration of a computing device or resource cannot only be performed by users in the local administrators' security group. In fact, there are numerous user rights which, when granted to specific entities such as users, computers, or other securable objects, including domain and local resources, result in the entity having, or easily achieving, local administrator equivalent privileges. Examples of privileges, in a Microsoft® Windows® environment, that can be granted through user rights assignments and result in effective administrative control of a machine are the SeEnableDelegationPrivilege, SeImpersonatePrivilege, SeLoadDriverPrivilege, SeTcbPrivilege, SeDebugPrivilege, SeTrustedCredManAccessPrivilege, and SeCreateTokenPrivilege. The listed privileges are exemplary only and, particularly in other computing environments, different user right assignments and privileges may result in a non-administrative user having administrative rights.

When attempting to see who has administrator equivalent privileges on a machine, users having the above discussed privileges must be inspected and aggregated on top of the typical local users' security group. This is especially true when creating security and/or attack graphs which attempt to map this privilege data across multiple computers to illustrate potential avenues of attack if a credential is stolen and/or harvested. Having such data enables the creation of true and literal control plans in an environment that are the most high-fidelity way to explicitly show who has control of an individual machine or resource at any given time. Security graphs may include mapping of privilege domain entities or groups and take into account local administrator groups. Embodiments of the security systems and methods described herein expand security and attack graphs beyond the local administration groups by illustrating exactly who can exert control over a machine, at any specific time, which drastically improves the fidelity of the results. When performed over a series of computers, this data provides verbose and concrete illustrations of exactly what user and user identifiers map to what effective controls over what machines. This is accomplished by enumerating the user rights against very specific permissions as well as applying this resultant set to the securable objects which can control a computer.

Securable objects can map to a number of different entities such as groups, computers, users, services, domains, localities, etc. Access to the securable objects is gained through the exercise of privileges. By monitoring the privileges as they relate to the ability to take over a computer and including them in an attack graph solution, embodiments of the security risk identification systems and methods disclosed herein drill down to the lowest level, which is the privileges, to which securable objects can map to give the best results.

With the above objects in mind, FIG. 1 is a block diagram of a computing-device-based system for identifying a security risk to one or more computing devices in accordance with an exemplary embodiment. As shown in FIG. 1, a computing device 100 includes a memory 104, a processor 106 and program logic 108. Program logic 108 is stored by memory 104 and includes a security group analyzer 110, a privileges analyzer 112, an ASEP access analyzer 114, a security risk identifier 116, a security risk handler 118, a security graph builder 120 and a security data collector 122. These features are described below with reference to FIG. 1.

Computing device 100 may be any type of computing device, including a mobile device such as a mobile computer or mobile computing device (e.g., a Microsoft® Surface® device, a personal digital assistant (PDA), a laptop computer, a notebook computer, a tablet computer such as an Apple iPad™, a netbook, etc.), a smart phone, a wearable computing device (e.g., a head-mounted device including smart glasses such as Google® Glass™, etc.), or other type of mobile device, or a stationary computing device such as a desktop computer, a video game console, or PC (personal computer). Computing device 100 may also be a physical or virtual machine hosted in the cloud in association with a cloud service such as Microsoft® Azure®. Access to the various functions of computing device 100 is controlled through the use of credentials and user rights. Thus, to access a securable function of computing device 100, a user must possess a specific set of credentials or user rights.

Memory 104 is included in computing device 100. Memory 104 may be any type of suitable memory such as a random-access memory, read-only memory, a hard disk drive, etc., and may comprise one or more memory devices. Memory 104 stores program logic 108 for the security risk identification system. In addition, securable objects are contained in memory 104 that require specified credentials or user rights to access. Processor 106 executes program logic 108 stored in memory 104 that is used to implement the embodiment of the system for identifying a security risk illustrated in FIG. 1. Processor 108 may comprise circuitry and may be implemented as one or more microprocessors, microprocessor cores, applications-specific integrated circuits (ASICs), or the like.

Program logic 108 contains the logical components (e.g., program instructions) used in the embodiment of FIG. 1 to implement the system for identifying a security risk. Program logic 108 is stored in memory 104 and executed by processor 106 which is configured to access memory 104.

Program logic 108 contains security group analyzer 110. Security group analyzer 110 is used to identify a security group, such as a local administrators' group, having a common set of privileges with respect to performing tasks on computing device 100. The security group may include local and domain accounts—as well as nested groups. Security group analyzer 110 may receive information identifying a security group from security data collector 122. Security data collector 122 may utilize an existing application programming interface (API) of computing device 100 to collect such information. Security data collector 122 may be wholly or partially incorporated into the program logic of the security group analyzer 110 itself.

Privileges analyzer 112 examines user rights assignments to identify users having certain privileges that have been obtained through a user right assignment. The type of user right assignments examined may depend upon the circumstances and type of the security threat being analyzed. Certain user right assignments are of particular interest when identifying security risks in that these user rights assignments provide users with privileges that are similar in some ways to the privileges of an administrator. These user rights assignments may provide unintended escalation paths for an adversary to gain control of a machine. In particular, user rights assignments related to enabling a computer or user account to be trusted for delegation, enabling a program to impersonate a client, loading or unloading a device driver, attaching a debugger to a process, accessing a credential manager, creating an access token, or generating audit records in a security log may provide unexpected administrative privileges to certain users that can potentially be used to compromise a machine or network. Examples of these user rights assignments are discussed in more detail below with respect to FIG. 6. Privileges analyzer 112 examines the user rights assignments on computing device 100 to identify any users that have obtained specified privileges to securable objects on computing device 100 through a user rights assignment.

ASEP access analyzer 114 is used to discover users having access to an autostart extensibility point (ASEP) of computing device 100. As used herein, the term ASEP is intended to generally refer to any mechanism by which a computer program can be caused to execute automatically after a computing device is powered on or booted up. In one embodiment, the users discovered by ASEP access analyzer 114 may include users having access to an ASEP entry as well as users having access to an image path identified by an ASEP entry. An ASEP entry may comprise an entry in a list of entries that are used by an operating system to determine which programs should be executed automatically at startup. For example, the entry may be part of a registry maintained by an operating system. Each ASEP entry may identify an image path, which comprises a pointer to the code to be executed automatically at startup. ASEP entries and the image paths identified by them provide escalation paths an adversary might place in the computing environment to remain persistent in a stealthy way and are crucial to identifying security threats. ASEP access analyzer 114 examines the ASEP entries and the image paths identified by the ASEP entries and compiles a list of users having access to the entries or image paths.

Security risk identifier 116 analyzes and compares the users and/or credentials identified by security group analyzer 110, privileges analyzer 112, and ASEP access analyzer 114 to identify potential security threats. For example, security risk identifier 116 may compare a first set of users identified by security group analyzer 110 with a second set of users identified by privileges analyzer 112 to identify users that are in the second set of users but are not in the first set of users. These users may represent non-administrative users that have obtained administrative privileges through user rights assignments. As a further example, security risk identifier 116 may compare a first set of users identified by security group analyzer 110 with the users discovered by ASEP access analyzer 114 to identify users discovered by ASEP access analyzer 114 that do not have credentials in the first set of credentials. These users may be representative of non-administrative users that have obtained administrative privileges through access to ASEPs.

Security risk handler 118 examines the security risk identified by security risk identifier 116 and determines if any type of remedial and/or responsive action is appropriate. Security risk handler 118 may take any number of remedial or responsive actions such as transmitting a notification to at least one entity that includes a credential or user identified as a security risk, monitoring a behavior of a credential or user identified as a security risk, analyzing privileges with respect to performing tasks on a computing device by a credential or user identified as a security risk and/or automatically revoking a credential or privilege of a user identified as a security risk.

Security graph builder 120 is used to build a security graph that specifies the interrelationships between credentials, users and access to effective control of computing device 100. The security graph may be an attack graph that identifies potential avenues of attack against computing device 100. The information received from security group analyzer 110, privileges analyzer 112, ASEP access analyzer 114 and security risk identifier 116 can be used to expand security and attack graphs beyond local administrators' groups and illustrate exactly who can exert effective control over a machine, at any specific time.

Security data collector 122 identifies users that have access to ASEPs or specific user rights and/or privileges on computing device 100 for security group analyzer 110, privileges analyzer 112, and ASEP access analyzer 114. Security data collector 122 may utilize an existing API of computing device 100 to enumerate which users and/or credentials have access to ASEPs, specific user rights and/or privileges on computing device 100.

Figure 2:
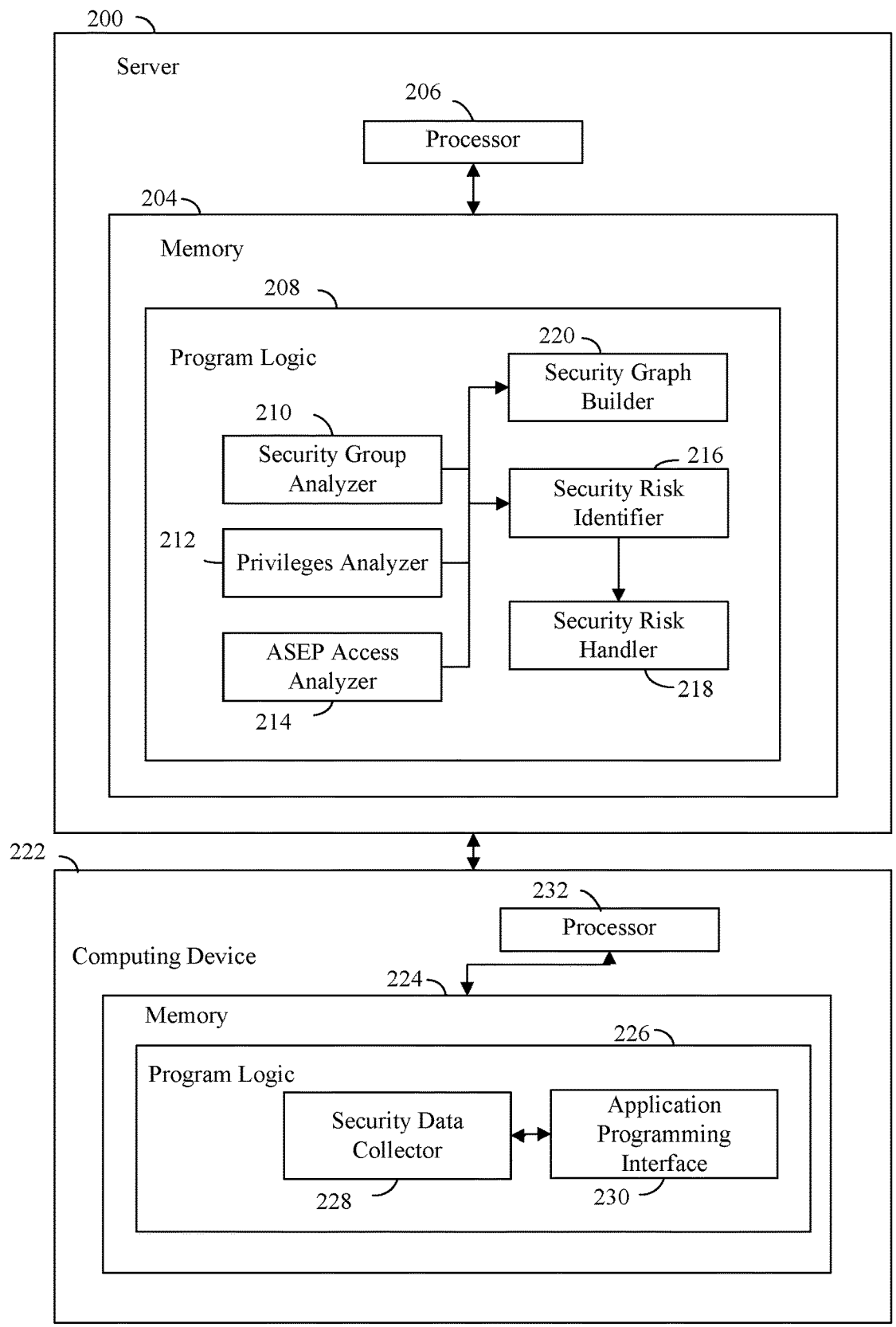
FIG. 2 is a block diagram of a server-based system for identifying a security risk to one or more computing devices in accordance with an example embodiment.

FIG. 2 is a block diagram of a server-based system for identifying a security risk to one or more computing devices in accordance with an example embodiment. As shown in FIG. 2, server 200 includes a memory 204, a processor 206, and program logic 208. Program logic 208 is stored by memory 204 and includes a security group analyzer 210, a privileges analyzer 212, an ASEP access analyzer 214, a security risk identifier 216, a security risk handler 118 and a security graph builder 220. Program logic 208 is used to analyze a remote computing device 222 to identify a security risk. As further shown in FIG. 2, computing device 222 includes a memory 224, a processor 232, and program logic 226. Program logic 226 is stored by memory 224 and includes a security data collector 228 and an application programming interface (API) 230. These features are described below with reference to FIG. 2.

Server 200 is communicatively coupled to remote computing device 222 for the purpose of identifying a security risk. Server 200 may comprise one or more server devices and/or other types of computing devices. Computing device 222 and server 200 may be communicatively coupled via a network (e.g., a LAN (local area network), a WAN (wide area network), or any combination of networks, such as the Internet).

Memory 204 in server 200 stores program logic 208 required for the risk identification system and processor 206 executes program logic 208 to identify security risks to computing devices such as computing device 222. Program logic 208 contains server logic components 210, 212, 214, 216, 218 and 220 used in the exemplary embodiment of FIG. 2 to implement the server-based system for identifying a security risk.

Security group analyzer 210 is used to identify a security group having a common set of privileges such as a local administrators' group. In a manner similar to that discussed above, security group analyzer 210 may receive information identifying a security group from security data collector 228 in computing device 222. Security data collector 228 may utilize an existing API of computing device 222 to collect such information.

Privileges analyzer 212 examines user rights assignments on computing device 222 to identify users having certain privileges that were obtained through a user right assignment. As discussed in more detail herein, certain user right assignments are of particular interest in that these user rights assignments provide users with privileges that are equivalent in some respects to the privileges of an administrator. Privileges analyzer 212 examines the user rights assignments to identify any users that have obtained certain specified privileges through user rights assignments and provides the user identifiers to security risk identifier 216.

ASEP access analyzer 214 is used to identify or discover users having access to an autostart extensibility point of the computing device 222. The users identified by ASEP access analyzer 214 may include users having access to an ASEP entry as well as users having access to the image path pointed to by the ASEP entry.

Security risk identifier 216 analyzes and compares the users identified by security group analyzer 210, privileges analyzer 212 and ASEP access analyzer 214 to identify users having privileges that may pose a potential security threats. In particular, in the exemplary embodiment shown in FIG. 2, security risk identifier may identify users identified by privileges analyzer 212 and ASEP access analyzer 214 that are not in the security group identified by security group analyzer 210.

Security risk handler 218 examines the security risk identified by security risk identifier 216 and determines if any type of remedial or responsive action is appropriate. Security risk handler 218 may take any number of remedial actions such as transmitting a notification to at least one entity that includes a user identified as a security risk, monitoring a behavior of a user identified as a security risk, analyzing privileges with respect to performing tasks on a computing device by a user identified as a security risk and automatically revoking a credential for a user identified as a security risk or at least one privilege associated with the user as discussed in more detail herein.

Security graph builder 220 is used to build a security graph that specifies the interrelationships between users, credentials, privileges and effective control of machines. The security graph may be an attack graph that identifies potential avenues of attack against a machine, system, network or node. The information received from security group analyzer 210, privileges analyzer 212, ASEP access analyzer 214 and security risk identifier 216 can be used to expand security and attack graphs beyond local administrators' groups and illustrate exactly who can exert effective control over a machine, at any specific time.

Security data collector 228 identifies users that have access to ASEPs or specific user rights and/or privileges for security group analyzer 210, privileges analyzer 212, and ASEP access analyzer 214. Security data collector 228 may utilize an existing API 230 of computing device 222 to enumerate which users have access to ASEPs, specific user rights and/or privileges on computing device 222.

Figure 3:
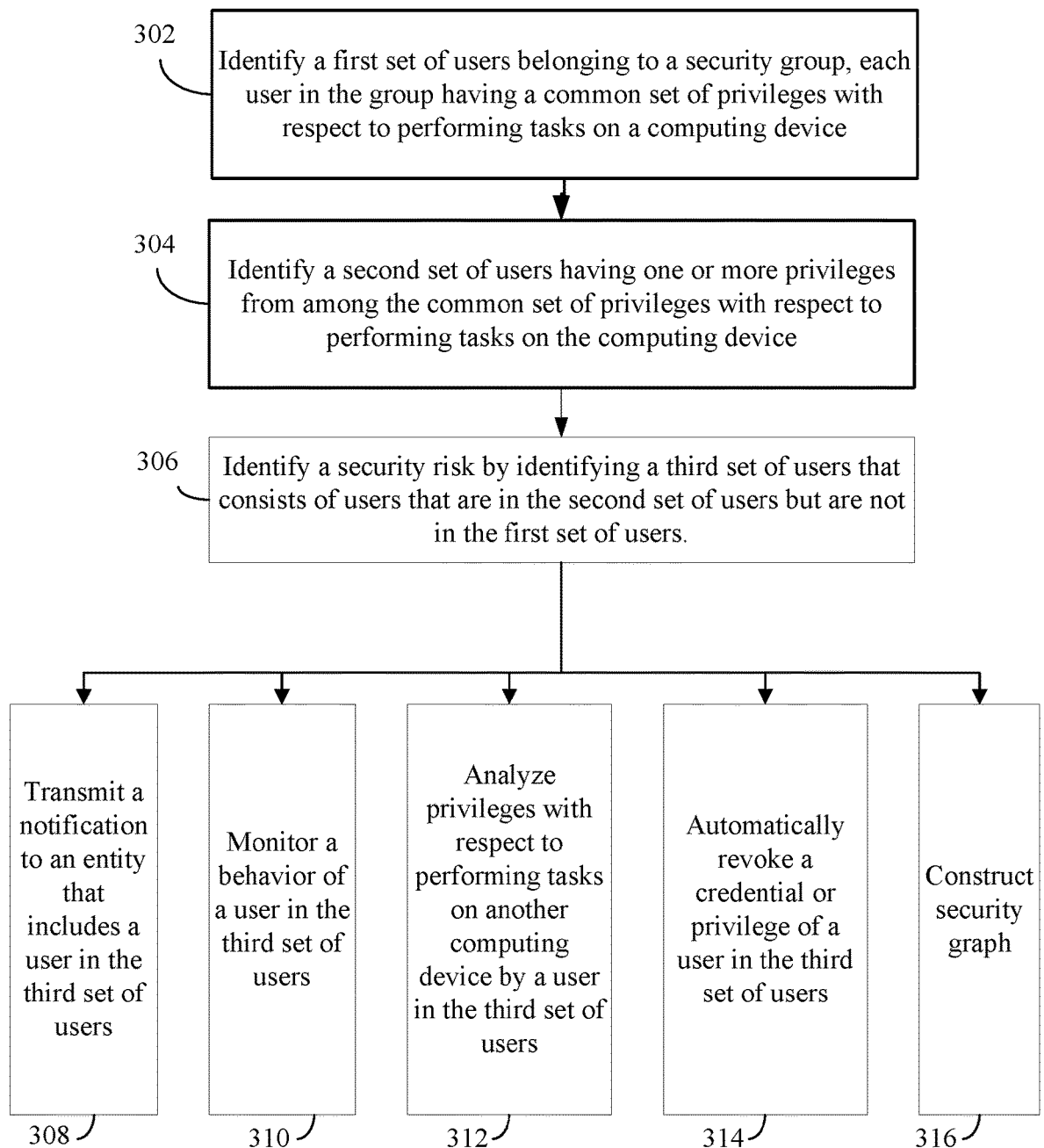
FIG. 3 is a flowchart of a method of identifying and addressing a security risk in accordance with an example embodiment.

FIG. 3 is a flowchart 300 of a method of identifying and addressing a security risk in accordance with an example embodiment. As discussed above, local administration cannot only be performed by users in the local administrators' security group. There are numerous user rights which, when granted to specific entities can result in the entities having or easily achieving local administration or equivalent privileges. Examples of such user rights are discussed in detail below with respect to FIG. 6. The method of FIG. 3 involves identifying non-administrator users that have administrator equivalent privileges to effectively control a machine that may have been gained through user rights assignments.

Flowchart 300 begins in step 302 wherein a first set of users belonging to a security group is identified, each user in the group having a common set of privileges with respect to performing tasks on a computing device. As an example, users in a local administrators' group can be obtained through interaction with an API of the relevant computing device, such as an API provided by an operating system (OS) of the relevant computing device. The security group may represent users that are trusted and expected to be exercising control of a machine or network. Step 302 can, for example, be performed by security group analyzer 110 of FIG. 1 or security group analyzer 210 of FIG. 2.

In step 304, a second set of users having one or more privileges from among the common set of privileges with respect to performing tasks on the computing device is identified. These privileges may be granted or gained through user rights assignments and may be privileges which provide or easily lead to administrative equivalent privileges for a machine or network. Step 304 can, for example, be performed by privileges analyzer 112 of FIG. 1 or privileges analyzer 212 of FIG. 2.

In step 306, a security risk is identified by identifying a third set of users that consists of users that are in the second set of users but are not in the first set of users. For example, users in a local administrators' group can be compared to users that have privileges similar or equivalent to some of the privileges of the local administrators' group to identify users that unexpectedly have administrative privileges despite not being in the local administrators' group. Step 306 can, for example, be performed by security risk identifier 116 of FIG. 1 or security risk identifier 216 of FIG. 2.

In response to identifying a security risk, a number of responsive actions may be taken. In step 308, a notification is transmitted to an entity that includes a user in the third set of users. Thus, if a user is identified in step 306 that has unexpected administrative privileges, a notification regarding the user may be transmitted to security personnel to inform them of the identified security risk.

In step 310, a behavior of a user in the third set of users is monitored. For example, a user having effective administrative privileges can be subjected to additional monitoring across one or more computing devices to determine if the user is behaving in an abnormal, suspicious or malicious manner.

In step 312, privileges are analyzed with respect to performing tasks on another computing device by a user in the third set of users. As an example, any users identified as a security risk can be further examined to determine if the user is behaving on other computing devices in a manner that makes their cumulative behavior suspect.

In step 314, a credential or a privilege of a user in the third set of users is automatically revoked. As an example, a user that has been discovered to have unexpected administrative privileges can have their credentials automatically revoked to prevent any future undesirable actions by the holder of the credentials.

Steps 308, 310, 312 and 314 can, for example, be performed by security risk handler 118 of FIG. 1 or security risk handler 218 of FIG. 2.

In step 316, a security graph is constructed based upon suspect users and security risks identified in steps 302, 304 and 306. Including the information in a security graph dramatically improves the ability to identify potential avenues of attack. Step 316 can, for example, be performed by security graph builder 220 of FIG. 2.

Figure 4:
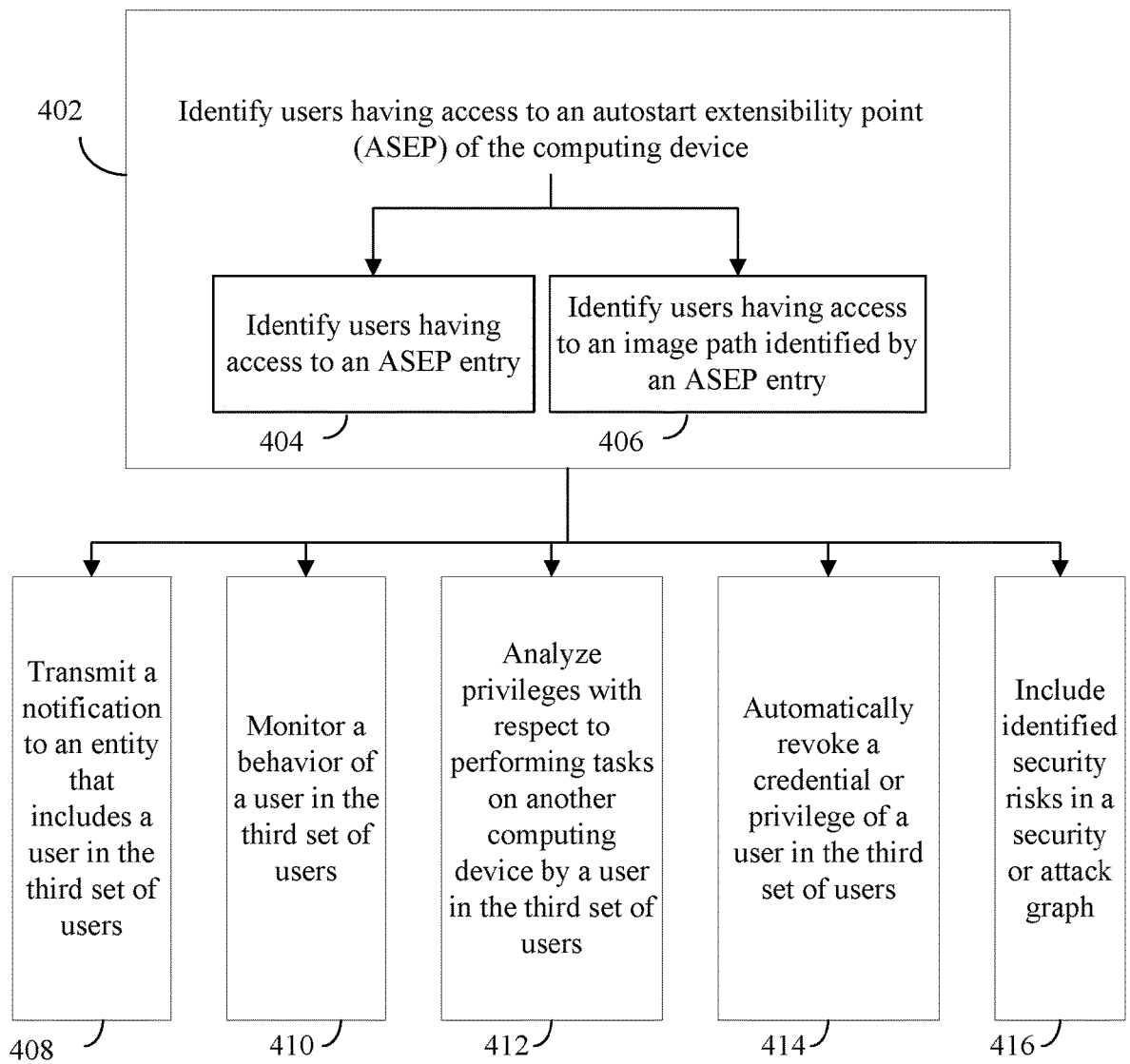
FIG. 4 is a flowchart of a method of identifying and addressing a security risk in accordance with another example embodiment.

FIG. 4 is a flowchart 400 of a method of identifying and addressing a security risk in accordance with another example embodiment. The method involves identifying users that have access to ASEPs that may allow them to gain unexpected control of a machine. Any user that has access to an ASEP can potentially compromise a machine or network through arbitrary code execution. Flowchart 400 begins in step 402 wherein users having access to an autostart extensibility point (ASEP) of the computing device are identified. As an example, security data collector 228 of FIG. 2 may provide an access control list that identifies users having access to an ASEP. Step 402 can, for example, be performed by ASEP access analyzer 114 of FIG. 1 or ASEP access analyzer 214 of FIG. 2.

In the embodiment of FIG. 4, identifying users that have access to an ASEP involves two separate steps. In sub-step 404, users having access to an ASEP entry are identified. These are users that are directly able to access an ASEP entry and, thus, possess the ability to run any arbitrary code. Sub-step 404 can, for example, be performed by ASEP access analyzer 114 of FIG. 1 or ASEP access analyzer 214 of FIG. 2.

In sub-step 406, users having access to an image path identified by an ASEP entry are identified. These are users that are have access to an image identified by an ASEP entry. Any users having access to the image path identified by an ASEP entry can insert malicious code into the path that may be automatically executed and compromise the machine or network. Sub-step 406 can, for example, be performed by ASEP access analyzer 114 of FIG. 1 or ASEP access analyzer 214 of FIG. 2.

Any users having access to an ASEP entry pose a potential security risk to a machine or system and may be identified in an attack graph that illustrates potential avenues of attack. As discussed above, once a user that poses a security risk has been identified, any number of different actions may be taken to respond to the risk. In step 408, a notification is transmitted to at least one entity that includes a user identified as a security risk. In step 410, a behavior of a user identified as a security risk is monitored. In step 412, privileges are analyzed with respect to performing tasks on a computing device by a user identified as a security risk. In step 414, a credential of a user identified as a security risk or at least one privilege associated with the user is automatically revoked. In step 416, the identified security risks are included in a security or attack graph that illustrates potential avenues of attack on a machine or network.

Figure 5:
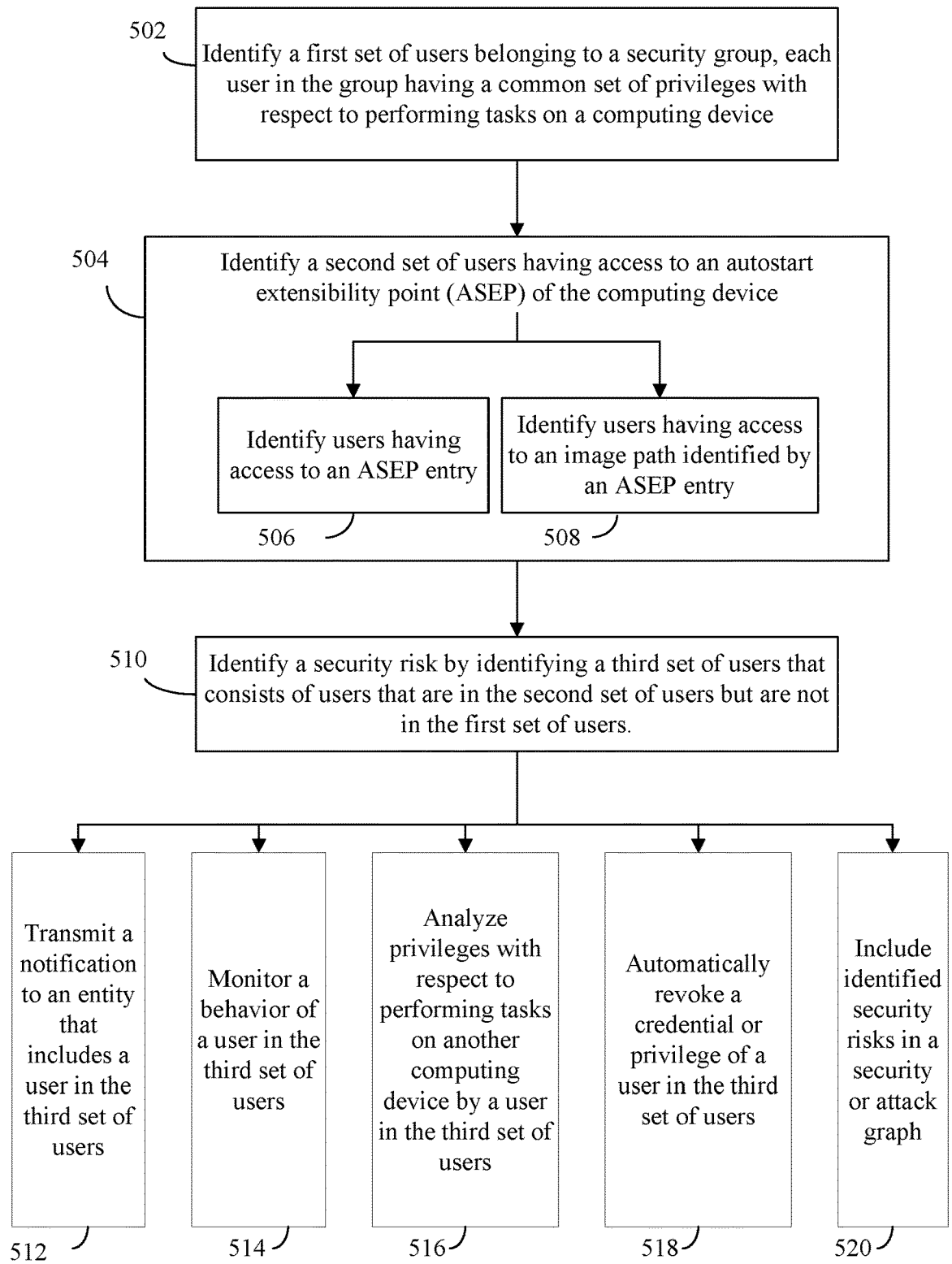
FIG. 5 is a flowchart of a method of identifying and addressing a security risk in accordance with another example embodiment.

FIG. 5 is a flowchart 500 of a method of identifying and addressing a security risk in accordance with another example embodiment. In the embodiment of FIG. 5, users having privileges or access to ASEPs are compared to users in a security group to identify a security risk and take remedial actions. Flowchart 500 begins in step 502 wherein a first set of users belonging to a security group is identified, each user in the group having a common set of privileges with respect to performing tasks on a computing device. As discussed above, the security group may be the local administrators' group identified by a security data collector such as security data collector 228 of FIG. 2.

In step 504, a second set of users having access to an autostart extensibility point (ASEP) of the computing device are identified. Access control lists for ASEPs are important to examine because any users that can write to these ASEPs can run any arbitrary code. Thus, users that have access control to the ASEPs can easily gain access to, or effective control of, a machine.

As discussed above, identifying users that have access to an ASEP may involve two separate steps. In sub-step 506, users having access to an ASEP entry are identified. As stated above, any users that can write to these entries can run any arbitrary code and pose a security risk to the machine or system. As an example, an ASEP entry can be modified to point to malicious code that is then automatically executed during operation of the machine or system.

In sub-step 508, users having access to an image path identified by an ASEP entry are identified. Any users that can write to these image paths can run any arbitrary code and pose a security risk to the machine or system. For example, malicious code could be inserted into an image path identified by an ASEP entry such that the code would be automatically executed under certain circumstances.

In step 510, a security risk is identified by identifying a third set of users that consists of users that are in the second set of users but are not in the first set of users. Any users that have access to ASEPs but are not in a security group such as the local administrators' group are automatically suspicious because they represent users that have a higher level of effective control than their granted credentials suggest was intended.

The flowchart 500 of FIG. 5 ends with the undertaking of an action in response to identification of the security risk. As discussed above, once a security risk has been identified any number of different actions may be taken. These include but are not limited to transmitting a notification to at least one entity that includes a user identified as a security risk as shown in step 512, monitoring a behavior of a user identified as a security risk as shown in step 514, analyzing privileges with respect to performing tasks on a computing device by a user identified as a security risk as shown in step 516, automatically revoking a credential or privilege of a user identified as a security risk as shown in step 518 and/or including the identified security risk in a security or attack graph as shown in step 520.

Figure 6:
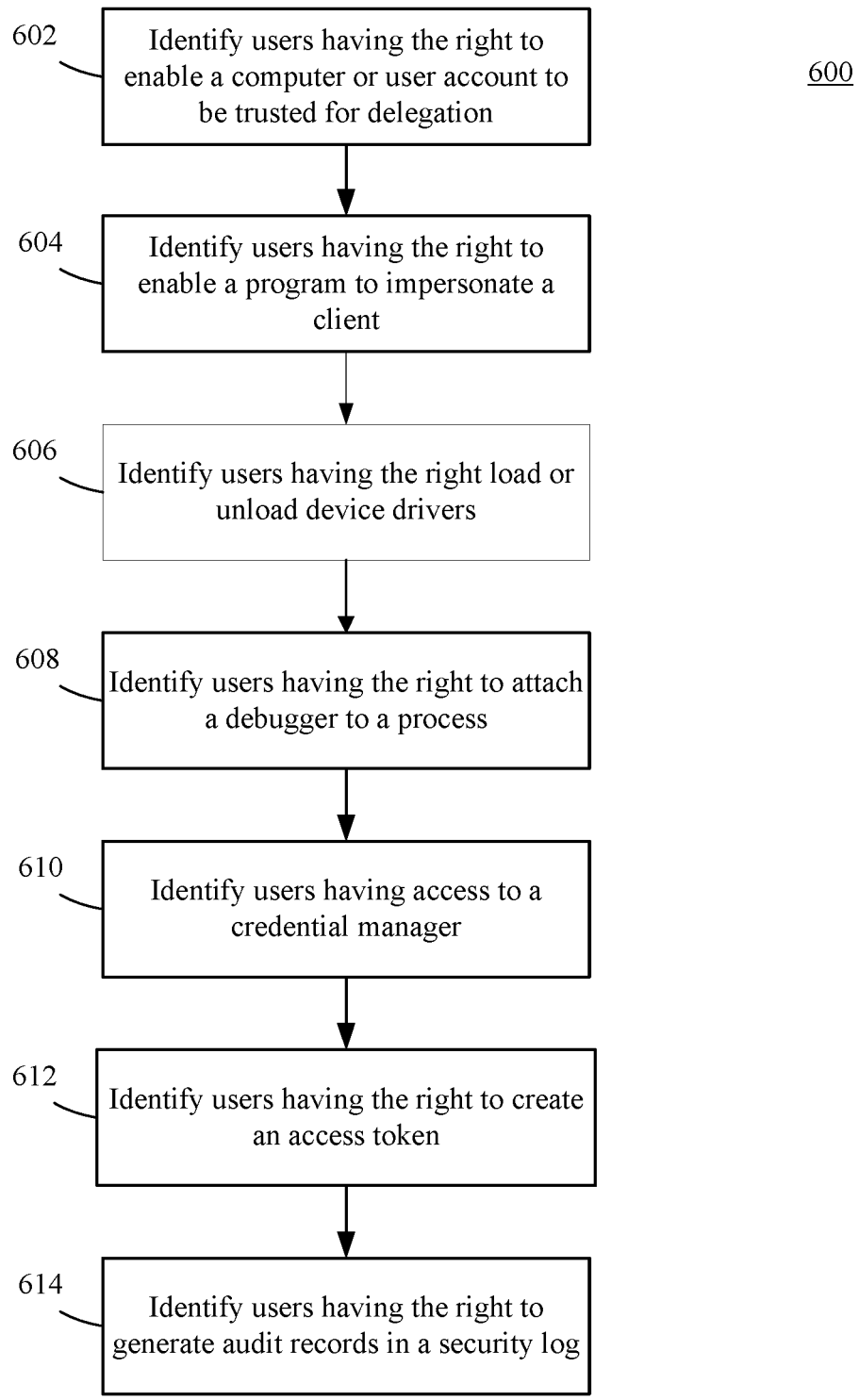
FIG. 6 is a flowchart of a method of identifying users that have user rights assignments that may pose a security risk in accordance with another example embodiment.

FIG. 6 is a flowchart 600 of a method of identifying users that have user rights assignments that provide privileges that may pose a security risk in accordance with another example embodiment. As discussed herein, certain user rights assignments provide privileges that may be equivalent in some respects to administrator privileges. Identifying users that have these user rights is crucial in detecting security threats to a machine or network. The method of flowchart 600 may be performed, for example, as part of step 304 of flowchart 300.

In step 602, users having the right to enable a computer or user account to be trusted for delegation are identified. This privilege allows the user to change the trusted for delegation setting on a user or computer object in a directory. The user or computer that is granted this privilege may also have write access to the account control flags on the object. Delegation of authentication is a capability that is used by multitier client/server applications. It allows a front-end service to use the credentials of a client in authenticating to a back-end service. For this to be possible, both client and server must be running under accounts that are trusted for delegation. Misuse of this privilege or the trusted for delegation settings can make the network vulnerable to sophisticated attacks that use Trojan horse programs, which impersonate incoming clients and use their credentials to gain access to network resources.

In step 604, users having the right to enable a program to impersonate a client are identified. This privilege allows programs running on behalf of a user to impersonate a client. Requiring this privilege prevents an unauthorized user from convincing a client to connect to a service they have created and impersonating that client, which can elevate the unauthorized user's permissions to administrative or system levels. Assigning this privilege can be a security risk, so it should only be assigned it to trusted users.

In step 606, users having the right to load or unload device drivers are identified. This privilege allows a user to install and remove drivers for devices, such as plug and play devices. Device drivers run as trusted or highly privileged code. A user who has load and unload device driver privileges could intentionally or unintentionally install malicious code masquerading as a device driver.

In step 608, users having the right to attach a debugger to a process are identified. Allowing a user to attach a debugger to any process provides access to sensitive and critical operating system components and can be used to compromise a system.

In step 610, users that have access to a credential manager are identified. This privilege allows a user to access a credential manager as a trusted caller. Having trusted access to the credential manager provides an avenue for gaining effective control of machine.

In step 612, users having the right to create an access token are identified. This privilege allows a process to create an access token by calling a token-creating application programming interface. The local system inherently has the privilege. The ability to create an access token can be used to compromise a machine or network.

In step 614, users having the right to generate audit records in a security log are identified. This privilege allows a process to generate audit records in the security log. The security log can be used to trace unauthorized system access. The ability to alter the security log can be used to conceal unauthorized access to, or presence on, a system. The local system also has this privilege inherently.

Users having the privileges set forth in FIG. 6 are identified since these users can potentially compromise or gain effective control of machine, system or network. Once the users have been identified they can be compared to users included in a security group, as discussed above in reference to flowchart 300 of FIG. 3. Users identified in flowchart 600 of FIG. 6 but not included in a security group may be identified as suspect users. Such users may be included in an attack graph that illustrates potential avenues for attacking a machine or system. Their inclusion in the attack graph dramatically increases its accuracy and effectiveness.

Figure 7:
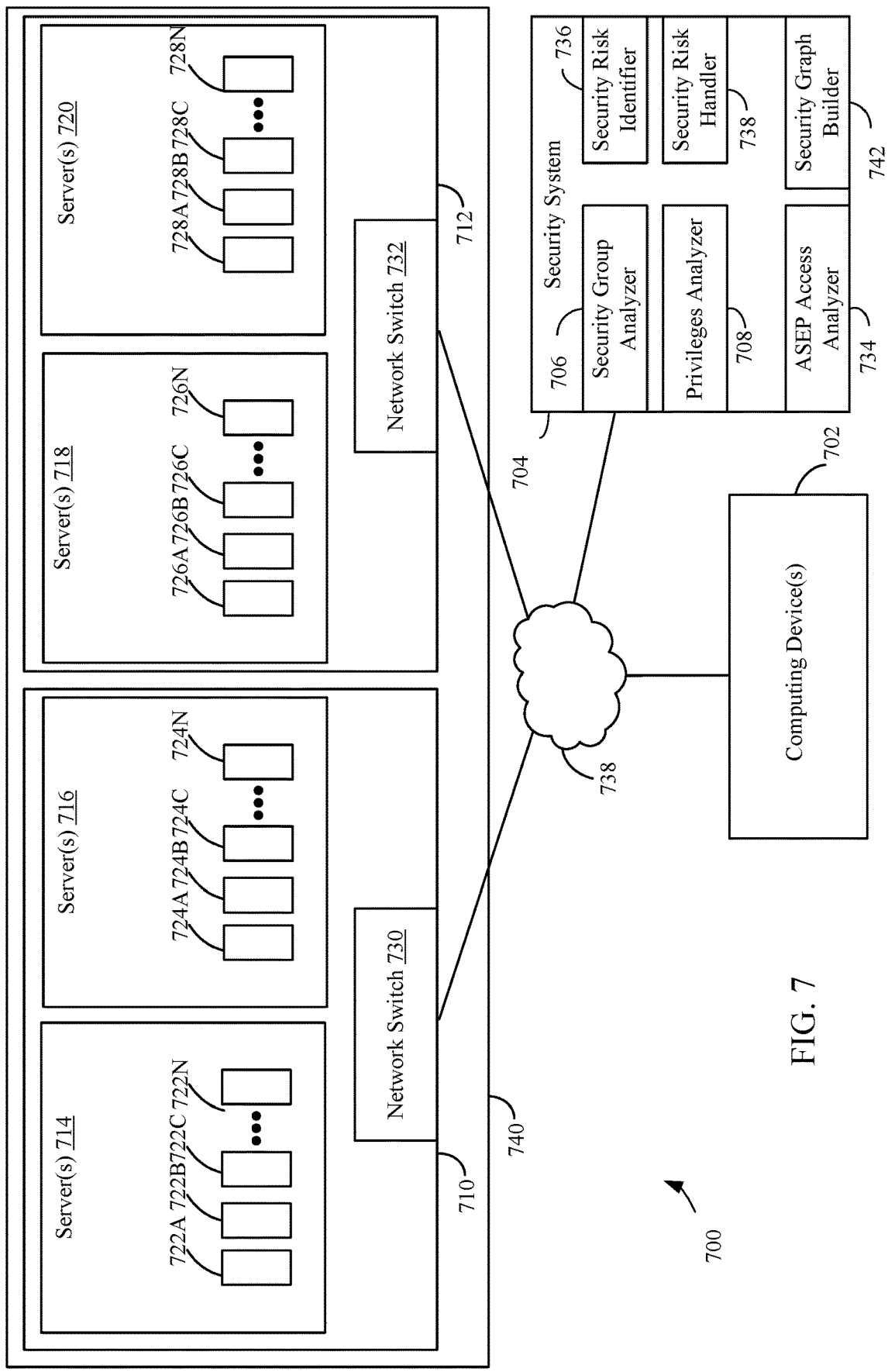
FIG. 7 shows a network service system configured for identifying security risks in accordance with an example embodiment.

A system for identifying security risks in accordance with various embodiments described herein can be implemented in different manners. For example, FIG. 7 shows a network service system 700 configured for identifying security risks in accordance with an example embodiment. As shown in FIG. 7, system 700 includes a plurality of resource sets 710 and 712, one or more computing devices 702, and one or more instances of a security system 704. Resource sets 710 and 712 (and any number of additional resource sets) define a network-accessible server infrastructure 740. In the example of FIG. 7, resource set 710 includes one or more servers 714, one or more servers 716, and a network switch 730, and resource set 712 includes one or more servers 718, one or more servers 720, and a network switch 732. Resource sets 710 and 712, computing device(s) 702, and security system(s) 704 are communicatively coupled via network 738. As shown in FIG. 7, security system 704 includes security group analyzer 706, privileges analyzer 708, ASEP access analyzer 734, security risk identifier 736, security risk handler 738 and security graph builder 742. Though security system 704 is shown separate from resource sets 710 and 712, in an embodiment, security system 704 may be included in one or more servers in one or more of resource sets 710 and 712. Furthermore, any number of security systems 704 may be present, such as one or more per resource set, one or more per server, etc. Network 738 may comprise one or more networks such as local area networks (LANs), wide area networks (WANs), enterprise networks, the Internet, etc., and may include one or more of wired and/or wireless portions. In an embodiment, resource sets 710 and 712, computing device(s) 702, and security system(s) 704 may communicate via one or more application programming interfaces (API).

Resource sets 710 and 712 may form a network-accessible server set, such as a cloud computing server network defined by network-accessible server infrastructure 740. For example, each of resource sets 710 and 712 may comprise a group or collection of servers (e.g., computing devices) that are each accessible by a network such as the Internet (e.g., in a "cloud-based" embodiment) to store, manage, and process data. As shown in the exemplary embodiment of FIG. 7, resource set 710 includes server(s) 714 and 716, and resource set 712 includes server(s) 718 and 720. Each of server(s) 714, 716, 718 and 720 may comprise any number of servers that are configured to host and execute one or more computing resources (e.g., computer networks, servers, storage, applications and services). For example, server(s) 714 may include servers 722A-722N, server(s) 716 may include servers 724A-724N, server(s) 718 may include servers 726A-726N, and server(s) 720 may include servers 728A-728N, where N is any integer greater than 1.

Resource sets 710 and 712 may include any type and number of other computing resources, including resources that facilitate communications with and between the servers (e.g., network switches, networks, etc.), storage by the servers (e.g., storage devices, etc.), resources that manage other resources (e.g., hypervisors that manage virtual machines to present a virtual operating platform for tenants of system 700, etc.), and/or further types of resources. Servers of a resource set may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, the servers of a resource set may be co-located (e.g., housed in one or more nearby buildings with associated components such as backup power supplies, redundant data communications, environmental controls, etc.) to form a datacenter, or may be arranged in other manners. Accordingly, in an embodiment, resource sets 710 and 712 may each be a datacenter in a distributed collection of datacenters.

In accordance with such an embodiment, each of resource sets 710 and 712 may be configured to service a particular geographical region. For example, resource set 710 may be configured to service the northeastern region of the United States, and resource set 712 may be configured to service the southwestern region of the United States. It is noted that the network-accessible server set may include any number of resource sets, and each resource set may service any number of geographical regions worldwide.

Note that the variable "N" is appended to various reference numerals identifying illustrated components to indicate that the number of such components is variable, for example, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

Each of server(s) 714, 716, 718, 720 may be configured to execute one or more services (including microservices), applications, and/or supporting services. As shown in FIG. 7, server(s) 714, 716, 718, 720 may each be configured to execute supporting services. A "supporting service" is a cloud computing service/application configured to manage a set of servers (e.g., a cluster of servers in servers 710) to operate as network-accessible (e.g., cloud-based) computing resources for users. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be coded in any programming language. Each of server(s) 714, 716, 718, 720 may be configured to execute any number of supporting services, including multiple instances of the same and/or different supporting services.

Computing device(s) 702 includes the computing devices of users (e.g., individual users, family users, enterprise users, governmental users, etc.) that may be tenants and/or that otherwise access network-accessible resource sets 710 and 712 for computing resources over network 738. Computing device(s) 702 may include any number of computing devices, including tens, hundreds, thousands, millions, or even greater numbers of computing devices. Computing devices of computing device(s) 702 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device(s) 702 may each interface with server(s) 714, 716, 718, 720 through application programming interfaces (APIs) and/or by other mechanisms. Note that any number of program interfaces may be present.

As described above, security system 704 is configured to identify security risks in computing device(s) 702, server(s) 714, 716, 718 and 720 and virtual machines hosted by server(s) 714, 716, 718 and 720. Security system 704 may incorporated in any type of stationary or mobile computing device(s) described elsewhere herein or otherwise known. For instance, security system 704 may be incorporated in a network/cloud supporting service mentioned elsewhere herein or otherwise known.

Example Computer System Implementation

Any of the components of computing device 100 of FIG. 1, server 200 and computing device 222 of FIG. 2 and any of the steps of the flowcharts of FIGS. 3-6 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
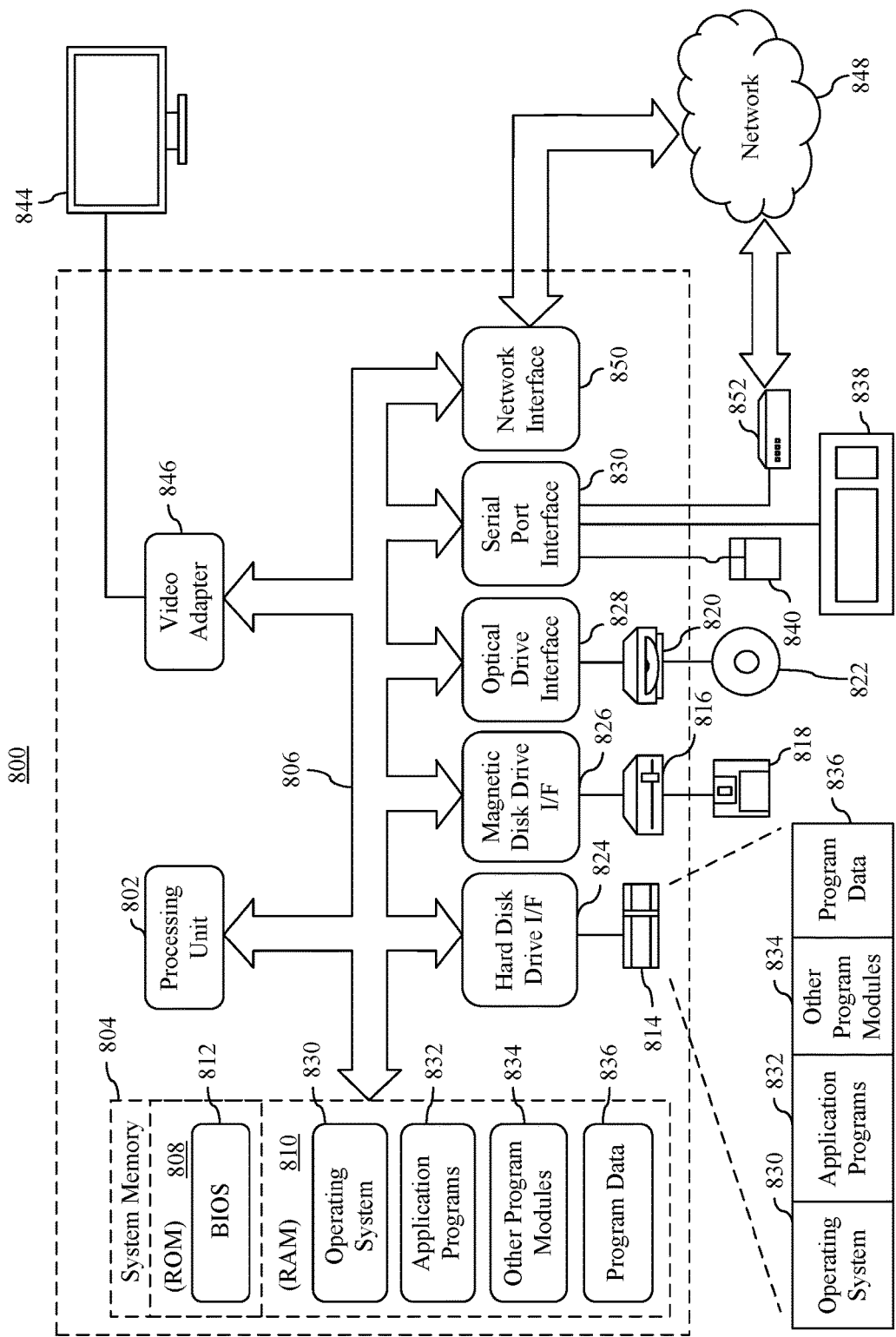
FIG. 8 depicts an example processor-based computer system that may be used to implement various embodiments described herein.

FIG. 8 depicts an example processor-based computer system 800 that may be used to implement various embodiments described herein. For example, system 800 may be used to implement any of the components of computing device 100 of FIG. 1, server 200 and computing device 222 of FIG. 2 as described above. System 800 may also be used to implement any or all the steps of the flowcharts depicted in FIGS. 3-6. The description of system 800 provided herein is provided for purposes of illustration, and is not intended to be limiting. Embodiments may be implemented in further types of computer systems, as would be known to persons skilled in the relevant art(s).

As shown in FIG. 8, system 800 includes a processing unit 802, a system memory 804, and a bus 806 that couples various system components including system memory 804 to processing unit 802. Processing unit 802 may comprise one or more microprocessors or microprocessor cores. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

System 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, BLU-RAY™ disk or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules or components may be stored on the hard disk, magnetic disk, optical disk, ROM, or RAM. These program modules include an operating system 830, one or more application programs 832, other program modules 834, and program data 836. In accordance with various embodiments, the program modules may include computer program logic that is executable by processing unit 802 to perform any or all the functions and features of computing device 100, server 200 or computing device 222 as described above. The program modules may also include computer program logic that, when executed by processing unit 802, performs any of the steps or operations shown or described in reference to the flowcharts of FIGS. 3-6.

A user may enter commands and information into system 800 through input devices such as a keyboard 838 and a pointing device 840. Other input devices (not shown) may include a microphone, joystick, game controller, scanner, or the like. In one embodiment, a touch screen is provided in conjunction with a display 844 to allow a user to provide user input via the application of a touch (as by a finger or stylus for example) to one or more points on the touch screen. These and other input devices are often connected to processing unit 802 through a serial port interface 842 that is coupled to bus 806, but may be connected by other interfaces, such as a parallel port, game port, or a universal serial bus (USB). Such interfaces may be wired or wireless interfaces.

A display 844 is also connected to bus 806 via an interface, such as a video adapter 846. In addition to display 844, system 800 may include other peripheral output devices (not shown) such as speakers and printers.

System 800 is connected to a network 848 (e.g., a local area network or wide area network such as the Internet) through a network interface or adapter 850, a modem 852, or other suitable means for establishing communications over the network. Modem 852, which may be internal or external, is connected to bus 806 via serial port interface 842. As used herein, the terms "computer program medium," "computer-readable medium," and "computer-readable storage medium" are used to generally refer to memory devices or storage structures such as the hard disk associated with hard disk drive 814, removable magnetic disk 818, removable optical disk 822, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850, serial port interface 842, or any other interface type. Such computer programs, when executed or loaded by an application, enable system 800 to implement features of embodiments of the present methods and systems discussed herein. Accordingly, such computer programs represent controllers of the system 800.

Embodiments are also directed to computer program products comprising software stored on any computer useable medium. Such software, when executed in one or more data processing devices, causes a data processing device(s) to operate as described herein. Embodiments of the present methods and systems employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

Additional Exemplary Embodiments

In an embodiment, a system for identifying a security risk to one or more computing devices comprises one or more memory devices that store program logic, and one or more processors operable to access the memory device(s) and to execute the program logic. The program logic includes a security group analyzer that identifies a first set of users belonging to a security group, each user in the security group having a common set of privileges with respect to performing tasks on a computing device. A privileges analyzer identifies a second set of users having one or more privileges from among the common set of privileges with respect to performing tasks on the computing device. A security risk identifier identifies the security risk by at least identifying a third set of users that consists of the users that are in the second set of users but are not in the first set of users.

In an embodiment, the security group comprises a local administrator group.

In an embodiment, the program logic further comprises an autostart extensibility point (ASEP) access analyzer that identifies a fourth set of users having access to an ASEP of the computing device. The security risk identifier identifies the security risk by at least identifying a fifth set of users that consists of the users that are in the fourth set of users but are not in the first set of users.

In an embodiment, the ASEP access analyzer identifies the fourth set of users by performing one or more of: identifying users having access to an ASEP entry or identifying users having access to an image path identified by an ASEP entry.

In an embodiment, the one or more privileges from among the common set of privileges include one or more of: enabling a computer or user account to be trusted for delegation; enabling a program to impersonate a client; loading or unloading a device driver; attaching a debugger to a process; accessing a credential manager; creating an access token; or generating audit records in a security log.

In an embodiment, the program logic further comprises a security risk handler that transmits a notification to at least one entity that includes at least one user in the third set of users.

In an embodiment, the program logic further comprises a security risk handler that receives the third set of users and monitors a behavior of at least one user in the third set of users.

In an embodiment, the program logic further comprises a security risk handler that receives the third set of users and analyzes privileges with respect to performing tasks on at least one other computing device by at least one user in the third set of users.

In an embodiment, the program logic further comprises a security risk handler that receives the third set of users and automatically revokes at least one credential or privilege of a user in the third set of users.

In an embodiment, a computer-implemented method of identifying a security risk to one or more computing devices comprises identifying a first set of users belonging to a security group, each user in the security group having a common set of privileges with respect to performing tasks on a computing device. A second set of users having access to an autostart extensibility point (ASEP) of the computing device is identified. The security risk is identified by at least identifying a third set of users that consists of the users that are in the second set of users but are not in the first set of users.

In an embodiment, the security group comprises a local administrator group.

In an embodiment, a fourth set of users having one or more privileges from among the common set of privileges with respect to performing tasks on the computing device is identified and the security risk is identified by at least identifying a fifth set of users that consists of the users that are in the fourth set of users but are not in the first set of users.

In an embodiment, the one or more privileges from among the common set of privileges include one or more of: enabling a computer or user account to be trusted for delegation; enabling a program to impersonate a client; loading or unloading a device driver; attaching a debugger to a process; accessing a credential manager; creating an access token; or generating audit records in a security log.

In an embodiment, identifying the second set of users comprises performing one or more of identifying users having access to an ASEP entry or identifying users having access to an image path identified by an ASEP entry.

In an embodiment, a notification is transmitted to at least one entity that includes at least one user in the third set of users.

In an embodiment, a behavior of at least one user in the third set of users is monitored.

In an embodiment, privileges are analyzed with respect to performing tasks on at least one other computing device by at least one user in the third set of users.

In an embodiment, at least one credential or privilege of a user in the third set of users is automatically revoked.

In an embodiment, a system for identifying users that may pose a security risk to one or more computing devices comprises one or more processor circuits and one or more memories that store program code configured to be executed by the one or more processor circuits to perform operations. The operations comprise identifying a first set of users having access to an autostart extensibility point (ASEP) entry of a computing device and identifying a second set of users having access to an image path identified by an ASEP entry of the computing device.

In an embodiment, the operations further comprise identifying a third set of users belonging to a security group, each user in the security group having a common set of privileges with respect to performing tasks on a computing device and identifying users in the first set of users and the second set of users that are not in the third set of users.

The example embodiments described herein are provided for illustrative purposes, and are not limiting. The examples described herein may be adapted to any type of system or method. Further structural and operational embodiments, including modifications/alterations, will become apparent to persons skilled in the relevant art(s) from the teachings herein.

CONCLUSION

While various embodiments of the present methods and systems have been described above, it should be understood that they have been presented by way of example only, and not limitation. It will be apparent to persons skilled in the relevant art that various changes in form and detail can be made therein without departing from the spirit and scope of the methods and systems. Thus, the breadth and scope of the present methods and systems should not be limited by any of the above-described exemplary embodiments, but should be defined only in accordance with the following claims and their equivalents.

What is claimed is:

1. A system for identifying a security risk to one or more computing devices, comprising:
    one or more memory devices that store program logic; and
    one or more processors operable to access the memory device(s) and to execute the program logic, the program logic comprising:
        a security group analyzer that identifies a security group having a common set of privileges with respect to performing tasks on a computing device, a first set of users belonging to the identified security group;
        a privileges analyzer that analyzes user rights assignments to identify second set of users having one or more privileges from among the common set of privileges with respect to performing tasks on the computing device, the second set of users including users that are in the first set of users and users that are not in the first set of users;
        a security risk identifier that identifies the security risk by at least identifying a third set of users that consists of the users that are in the second set of users but are not in the first set of users, the identifying the third set of users comprising comparing the first set of users to the second set of users; and
        a security risk handler that is configured to receive the third set of users and perform one or more of: monitor a behavior of at least one user in the third set of users, analyze privileges with respect to performing tasks on at least one other computing device by at least one user in the third set of users, or automatically revoke at least one credential or privilege of a user in the third set of users.

2. The system of claim 1, wherein the security group comprises a local administrator group.

3. The system of claim 1, wherein the program logic further comprises:
    an autostart extensibility point (ASEP) access analyzer that identifies a fourth set of users having access to an ASEP of the computing device;
    wherein the security risk identifier identifies the security risk by at least identifying a fifth set of users that consists of the users that are in the fourth set of users but are not in the first set of users.

4. The system of claim 3, wherein the ASEP access analyzer identifies the fourth set of users by performing one or more of:
   identifying users having access to an ASEP entry; or
   identifying users having access to an image path identified by an ASEP entry.

5. The system of claim 1 wherein the one or more privileges from among the common set of privileges include one or more of:
   enabling a computer or user account to be trusted for delegation;
   enabling a program to impersonate a client;
   loading or unloading a device driver;
   attaching a debugger to a process;
   accessing a credential manager;
   creating an access token; or
   generating audit records in a security log.

6. The system of claim 1, wherein the security risk handler is further configured to transmit a notification to at least one entity that includes at least one user in the third set of users.

7. The system of claim 1, wherein the security group analyzer is configured to identify the first set of users through automated interaction with an application programming interface (API) of the computing device.

8. The system of claim 1, wherein the program logic further comprises:
   a security graph builder that constructs a security graph that illustrates the security risk.

9. A computer-implemented method of identifying a security risk to one or more computing devices, comprising:
   identifying a security group having a common set of privileges with respect to performing tasks on a computing device, a first set of users belonging to the identified security group;
   identifying a second set of users having access to an autostart extensibility point (ASEP) of the computing device, the second set of users including users that are in the first set of users and users that are not in the first set of users;
   identifying the security risk by at least identifying a third set of users that consists of the users that are in the second set of users but are not in the first set of users, the identifying the third set of users comprising comparing the first set of users to the second set of users; and
   in response to the identifying the third set of users, performing one or more of: monitoring a behavior of at least one user in the third set of users, analyzing privileges with respect to performing tasks on at least one other computing device by at least one user in the third set of users, or automatically revoking at least one credential or privilege of a user in the third set of users.

10. The method of claim 9, wherein the security group comprises a local administrator group.

11. The method of claim 9, further comprising:
   identifying a fourth set of users having one or more privileges from among the common set of privileges with respect to performing tasks on the computing device; and
   identifying the security risk by at least identifying a fifth set of users that consists of the users that are in the fourth set of users but are not in the first set of users.

12. The method of claim 11 wherein the one or more privileges from among the common set of privileges include one or more of:
   enabling a computer or user account to be trusted for delegation;
   enabling a program to impersonate a client;
   loading or unloading a device driver;
   attaching a debugger to a process;
   accessing a credential manager;
   creating an access token; or
   generating audit records in a security log.

13. The method of claim 9, wherein identifying the second set of users comprises performing one or more of:
   identifying users having access to an ASEP entry; or
   identifying users having access to an image path identified by an ASEP entry.

14. The method of claim 9, further comprising:
   transmitting a notification to at least one entity that includes at least one user in the third set of users.

15. The method of claim 9, wherein identifying the first set of users comprises automatically interacting with an application programming interface (API) of the computing device.

16. The method of claim 9, further comprising:
   constructing a security graph that illustrates the security risk.

17. A system for identifying users that may pose a security risk to one or more computing devices, comprising:
   one or more processor circuits; and
   one or more memories that store program code configured to be executed by the one or more processor circuits to perform operations, the operations comprising:
      identifying a security group having a common set of privileges with respect to performing tasks on a computing device, a first set of users belonging to the identified security group;
      identifying a second set of users having access to an autostart extensibility point (ASEP) entry of a computing device, the second set of user including users that are in the first set of user and users that are not in the first set of users;
      identifying a third set of users having access to an image path identified by an ASEP entry of the computing device, the third set of user including users that are in the first set of user and users that are not in the first set of users;
      identifying a fourth set of users that consists of the users in the second set of users and the users in the third set of users that are not in the first set of users by comparing the first set of users and the second set of users to the third set of users; and
      in response to the identifying the fourth set of users, performing one or more of: monitoring a behavior of at least one user in the fourth set of users, analyzing privileges with respect to performing tasks on at least one other computing device by at least one user in the fourth set of users, or automatically revoking at least one credential or privilege of a user in the fourth set of users.

18. The system of claim 17, wherein the security group comprises a local administrator group.

19. The system of claim 17, wherein the common set of privileges include one or more of:
   enabling a computer or user account to be trusted for delegation;
   enabling a program to impersonate a client;
   loading or unloading a device driver;
   attaching a debugger to a process;
   accessing a credential manager;
   creating an access token; or
   generating audit records in a security log.

20. The system of claim 17, wherein the identifying the first second set of users having access to the ASEP entry of the computing device comprises identifying the second set of users based on an access control list.

\* \* \* \* \*